(12) United States Patent
Nozoe (10) Patent No.: US 7,337,669 B2
(45) Date of Patent: Mar. 4, 2008

(54) INERTIAL SENSOR AND COMBINED SENSOR THEREWITH

(75) Inventor: Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 120 days.

(21) Appl. No.: 10/954,587

(22) Filed: Oct. 1, 2004

(65) Prior Publication Data

US 2005/0072233 A1   Apr. 7, 2005

(30) Foreign Application Priority Data

Oct. 3, 2003   (JP) .............................. 2003-345400

(51) Int. Cl.
*G01P 15/00*   (2006.01)

(52) U.S. Cl. .................................. 73/514.16

(58) Field of Classification Search ............. 73/514.32, 73/504.15, 514.16; 361/283.3
See application file for complete search history.

(56) References Cited

U.S. PATENT DOCUMENTS

| | | | | |
|---|---|---|---|---|
| 5,506,454 | A | * | 4/1996 | Hanzawa et al. .......... 307/10.1 |
| 5,540,095 | A | * | 7/1996 | Sherman et al. ......... 73/514.18 |
| 5,583,290 | A | | 12/1996 | Lewis ..................... 73/514.18 |
| 5,744,717 | A | * | 4/1998 | Tanten et al. ............ 73/514.18 |
| 5,744,968 | A | * | 4/1998 | Czarnocki et al. .......... 324/608 |
| 6,298,709 | B1 | * | 10/2001 | Artzner et al. ............... 73/1.38 |
| 6,705,151 | B2 | * | 3/2004 | Nozoe et al. ................. 73/1.37 |
| 2003/0010123 | A1 | | 1/2003 | Malvern et al. ......... 73/514.32 |

FOREIGN PATENT DOCUMENTS

| | | | |
|---|---|---|---|
| EP | 1 367 367 | | 12/2003 |
| JP | 04090943 | A * | 3/1992 |
| JP | 7-128355 | | 5/1995 |
| JP | 08075777 | A * | 3/1996 |
| JP | 10-031032 | | 2/1998 |
| JP | 11258074 | A * | 9/1999 |
| JP | 2001-83177 | | 3/2001 |
| WO | 92-03740 | | 3/1992 |
| WO | 92/03740 | | 3/1992 |

OTHER PUBLICATIONS

Office Action for Chinese Patent Application No. 2004/10083382.5, issued Aug. 3, 2007.

* cited by examiner

*Primary Examiner*—Hezron Williams
*Assistant Examiner*—Tamiko Bellamy
(74) *Attorney, Agent, or Firm*—Wenderoth, Lind & Ponack, L.L.P.

(57) ABSTRACT

An inertial sensor is provided which includes a self-diagnosis circuit which applies an AC-bias signal voltage ahead of a synchronous demodulator, and thereby, supplies a diagnostic signal for detecting an abnormality in at least one of a detecting element and a detection circuit. This inertial sensor is capable of actively diagnosing whether or not there is an abnormality in the sensor itself, only by monitoring whether a predetermined DC offset signal is obtained from a sensor output terminal of the inertial sensor.

11 Claims, 10 Drawing Sheets

DETECTION AXIS

INERTIAL SENSOR AND COMBINED SENSOR THEREWITH

BACKGROUND OF THE INVENTION

1. Field of the Invention

The present invention relates to an inertial sensor which mainly detects an acceleration, and a combined sensor therewith.

2. Description of the Related Art

In recent years, a system has become popular which conducts extremely precise navigation and controls the safety of a vehicle by detecting the vehicle's acceleration. In such circumstances, various sensors have been presented which are capable of detecting an acceleration or an angular velocity as an inertial quantity of a vehicle. There is also a future sign that several sensors will combine together to produce a low-priced sensor with a high-level function.

In some of the conventional acceleration sensors of the electrostatic capacity type, changes in two electrostatic capacities (i.e., the capacities of two capacitors) are used which are generated between opposite electrodes placed near a cantilever that is displaced according to the applied acceleration.

Figure 10:
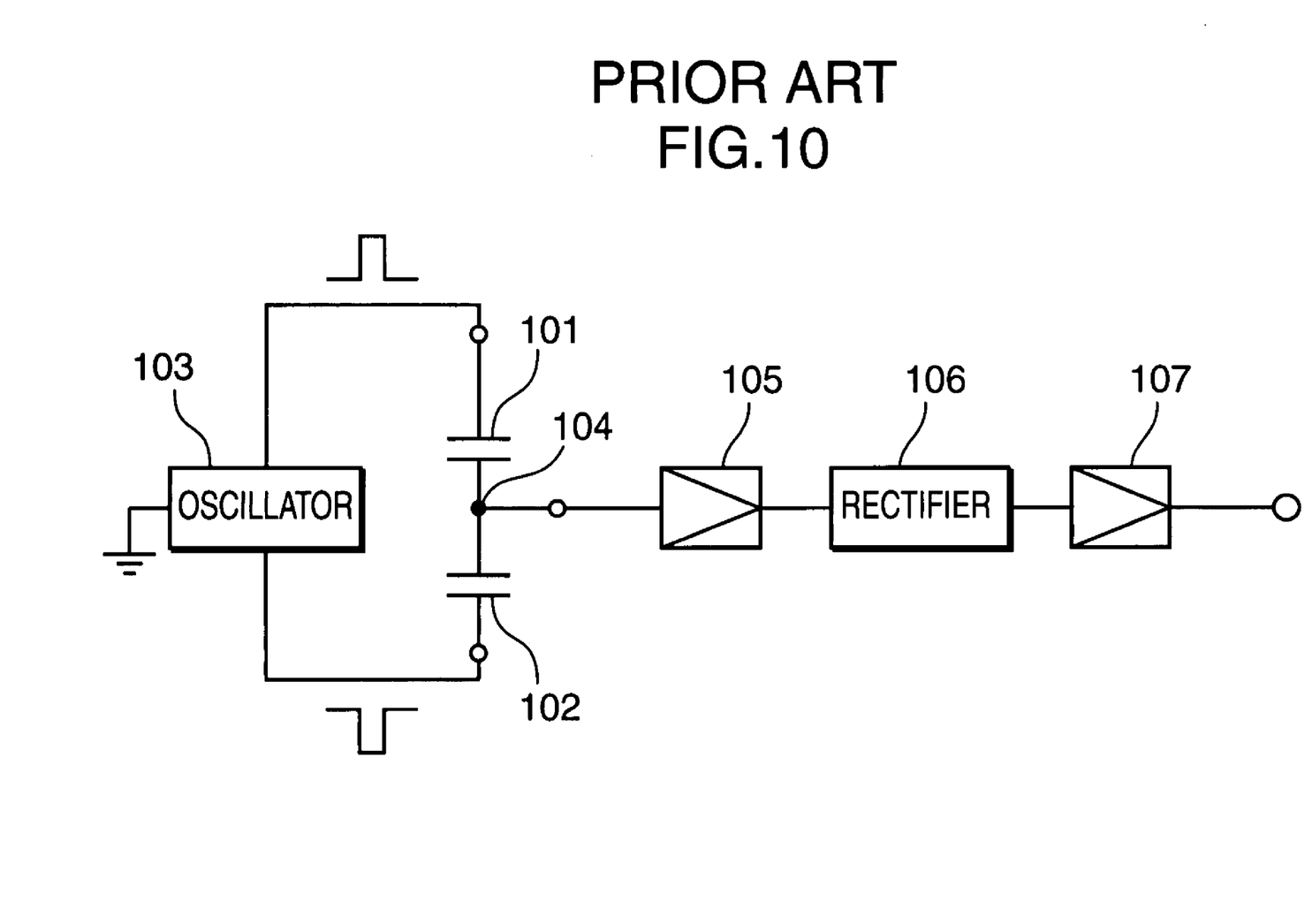
FIG. 10 is a block diagram, showing a conventional acceleration sensor of the electrostatic capacity type.

As such a sensor, for example, there is known an acceleration detector which is described in Japanese Unexamined Patent Publication (kohyo) No. 4-504003 specification. In this acceleration detector, as shown in FIG. 10, two capacitors 101, 102 are bridge-connected in series. From an oscillator 103, an AC-bias signal voltage is applied to the bridge which is made up of these capacitors 101, 102. Thus, an acceleration is applied, and thereby, a cantilever (not shown) is displaced. Therefore, when this cantilever is displaced, a divided-voltage electric potential is generated at a connection point 104 of the bridge, and then, it is detected by an amplifier 105. Next, it is rectified by a rectifier 106, and finally, it is amplified by an LPF 107. Thereby, a signal can be obtained which corresponds to the applied acceleration.

Figure 11:
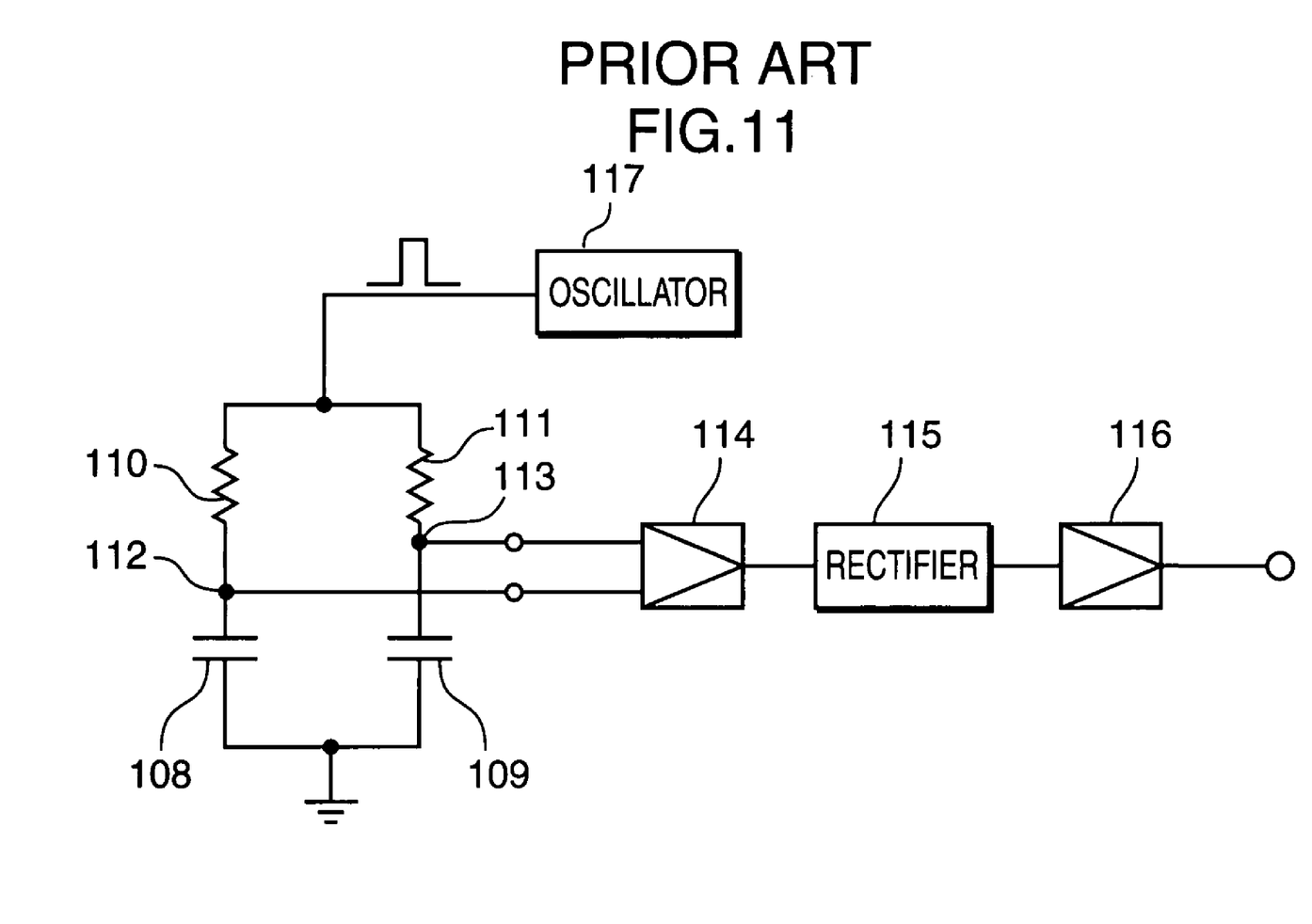
FIG. 11 is a block diagram, showing another conventional acceleration sensor of the electrostatic capacity type.

As another such sensor, a uni-axial angular-velocity/acceleration sensor is known which is described in Japanese Unexamined Patent Publication No. 7-128355 specification. In this sensor, as shown in FIG. 11, resistors 110, 111 are connected in series to two capacitors 108, 109, respectively, so that it has the configuration of a CR bridge. To this CR bridge, an AC-bias signal voltage is applied from an oscillator 117. Thus, an acceleration is applied, and thereby, a cantilever (not shown) is displaced. Therefore, when this cantilever is displaced, the balance of an impedance is changed at connection points 112, 113 of the CR bridge. Then, the electric potential at each connection point 112, 113 is detected by a differential amplifier 114. Next, it is rectified by a rectifier 115, and finally, it is amplified by an LPF 116. Thereby, a signal can be obtained which corresponds to the applied acceleration.

In the above described conventional acceleration sensor of the electrostatic capacity type, a signal which corresponds to the applied acceleration can be obtained. However, whether or not there is an abnormality in the sensor itself cannot be actively diagnosed.

SUMMARY OF THE INVENTION

It is an object of the present invention to provide an inertial sensor which is capable of actively diagnosing whether or not there is an abnormality in the sensor itself, and provide a combined sensor therewith.

An inertial sensor according to an aspect of the present invention comprises: a detecting element which includes a first capacitor portion that is made up of a first detection electrode which is provided in a fixed portion and a movable electrode which is provided in a movable portion, and a second capacitor portion that is made up of a second detection electrode which is provided in the fixed portion and a movable electrode which is provided in the movable portion; a drive circuit for applying an AC-bias signal voltage to the movable electrode; a detection circuit which includes: a differential-type detector that detects the difference in the quantity of an electric charge between the first and second detection electrodes which are configured so that the movable electrode is displaced according to an acceleration which is applied to the detecting element, the quantity of an electric charge which is generated in the second detection electrode decreases when the quantity of an electric charge which is generated in the first detection electrode increases, and conversely, the quantity of an electric charge which is generated in the second detection electrode increases when the quantity of an electric charge which is generated in the first detection electrode decreases; a synchronous demodulator which demodulates an output signal of the differential-type detector, synchronously with the AC-bias signal voltage; and an output amplifier which regulates an output signal from the synchronous demodulator; and a self-diagnosis circuit which applies the AC-bias signal voltage ahead of the synchronous demodulator, and thereby, supplies a diagnostic signal for detecting an abnormality in at least one of the detecting element and the detection circuit.

In this inertial sensor, whether a predetermined DC offset signal is obtained from an output-signal terminal of the inertial sensor, is monitored. Only by doing so, whether or not there is an abnormality in the sensor itself can be actively diagnosed.

An inertial sensor according to another aspect of the present invention comprises: a detecting element which includes a first capacitor portion that is made up of a first detection electrode which is provided in a fixed portion and a first movable electrode which is provided in a movable portion, and a second capacitor portion that is made up of a second detection electrode which is provided in the fixed portion and a second movable electrode which is provided in the movable portion, the detecting element being configured so that: the first and second detection electrodes are disposed at a predetermined distance on one and the same plane of the fixed portion; both ends of the movable portion are supported by the fixed portion; the first and second movable electrodes are disposed at a predetermined distance on one and the same plane of the movable portion and oppositely to the first and second detection electrodes, respectively; an additional mass portion is provided on the opposite side of the movable portion to the first and second movable electrodes which are provided in the movable portion; an acceleration is applied in the direction parallel to the electrode surfaces of the first and second detection electrodes; thereby the first and second movable electrodes rotate around the additional mass portion in the directions of the electrode surfaces of the first and second detection electrodes; if the electrode surface of the rotating first movable electrode comes close to the electrode surface of the first detection electrode, the electrode surface of the second movable electrode is displaced in the direction away from the electrode surface of the second detection electrode; and conversely, if the electrode surface of the first movable electrode goes away from the electrode surface of the first detection electrode, the electrode surface of the second movable electrode is displaced in the direction close to the electrode surface of the second detection electrode; a drive circuit for applying an AC-bias signal voltage to the first and second movable electrodes; a detection circuit which includes: a differential-type detector that detects the difference in the quantity of an electric charge between the first and second detection electrodes which are configured so that the first and second movable electrodes are displaced according to an acceleration which is applied in the directions parallel to the electrode surfaces of the first and second detection electrodes, the quantity of an electric charge which is generated in the second detection electrode decreases when the quantity of an electric charge which is generated in the first detection electrode increases, and conversely, the quantity of an electric charge which is generated in the second detection electrode increases when the quantity of an electric charge which is generated in the first detection electrode decreases; a synchronous demodulator which demodulates an output signal of the differential-type detector, synchronously with the AC-bias signal voltage; and an output amplifier which regulates an output signal from the synchronous demodulator; a resistance network which is inserted between the drive circuit and either of the first movable electrode and the second movable electrode, so that the value of a predetermined AC-bias signal voltage is set which is different from the value of the AC-bias signal voltage; and a circuit breaker which is inserted between one end of the resistance network and a ground, the circuit breaker being opened when an acceleration is detected, and it being closed when a diagnostic signal for detecting an abnormality in at least one of the detecting element, the drive circuit and the detection circuit is supplied.

In this inertial sensor, based on whether the circuit breaker is opened or closed, it becomes clear which state the sensor is in, the state where an acceleration is detected, or the state where a diagnostic signal for detecting an abnormality is supplied. In addition, based on the height of an AC-bias signal voltage which is applied to each of the first and second movable electrodes, the quantity of a DC offset signal for making an active diagnosis can be predetermined.

A combined sensor according to still another aspect of the present invention comprises an angular velocity sensor and any of the above described inertial sensors, wherein the angular velocity sensor includes: a vibrating element; and a self-oscillation loop circuit for applying a self-oscillation loop signal voltage which has an excitation frequency of 50 kHz or less, so that the amplitude of the vibrating element can be kept constant, and the self-oscillation loop signal voltage of the angular velocity sensor is used for the AC-bias signal voltage of the inertial sensor.

In this combined sensor, there is no need for a dedicated circuit only for generating an AC-bias signal voltage of the inertial sensor. In addition, a stable signal can be obtained as an AC-bias signal voltage of the inertial sensor.

These and other objects, features and advantages of the present invention will become more apparent upon reading of the following detailed description along with the accompanied drawings.

DETAILED DESCRIPTION OF THE INVENTION

First Embodiment

Figure 1:
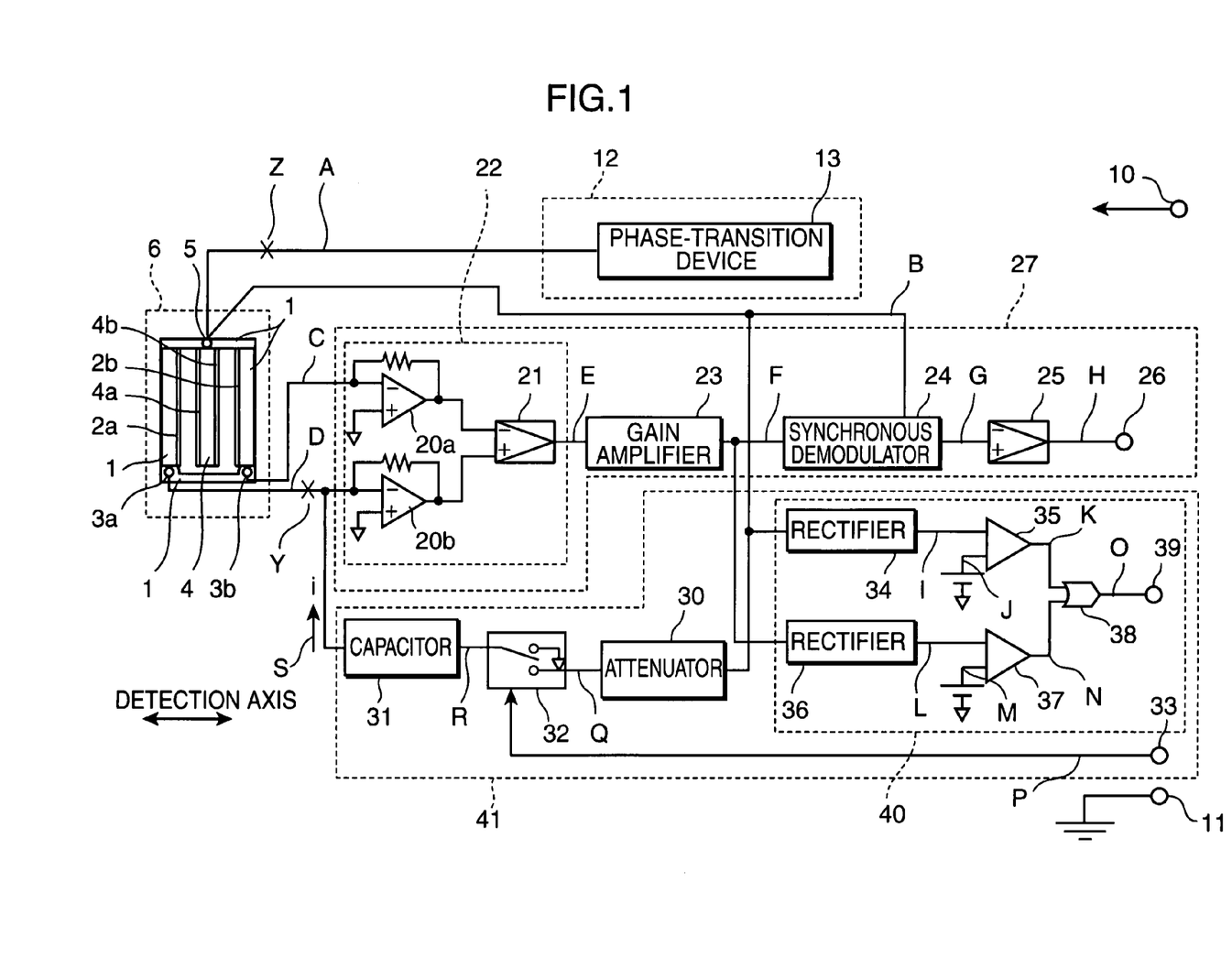
FIG. 1 is a block diagram, showing an inertial sensor according to a first embodiment of the present invention.
Figure 2:
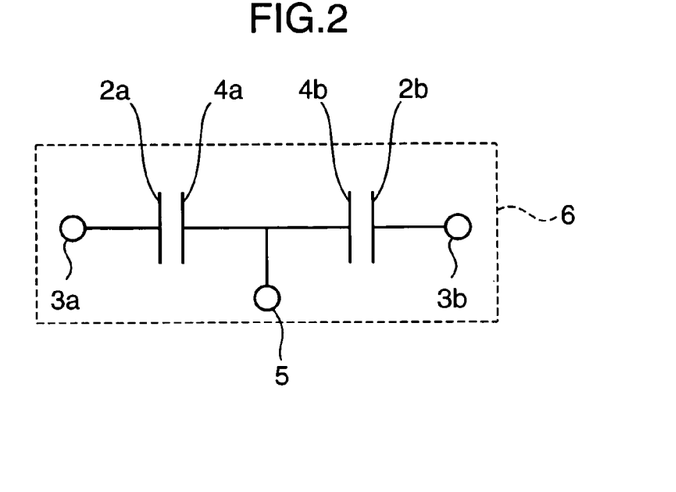
FIG. 2 is an equivalent circuit diagram, showing a detecting element which configures the inertial sensor shown in FIG. 1.
Figure 3:
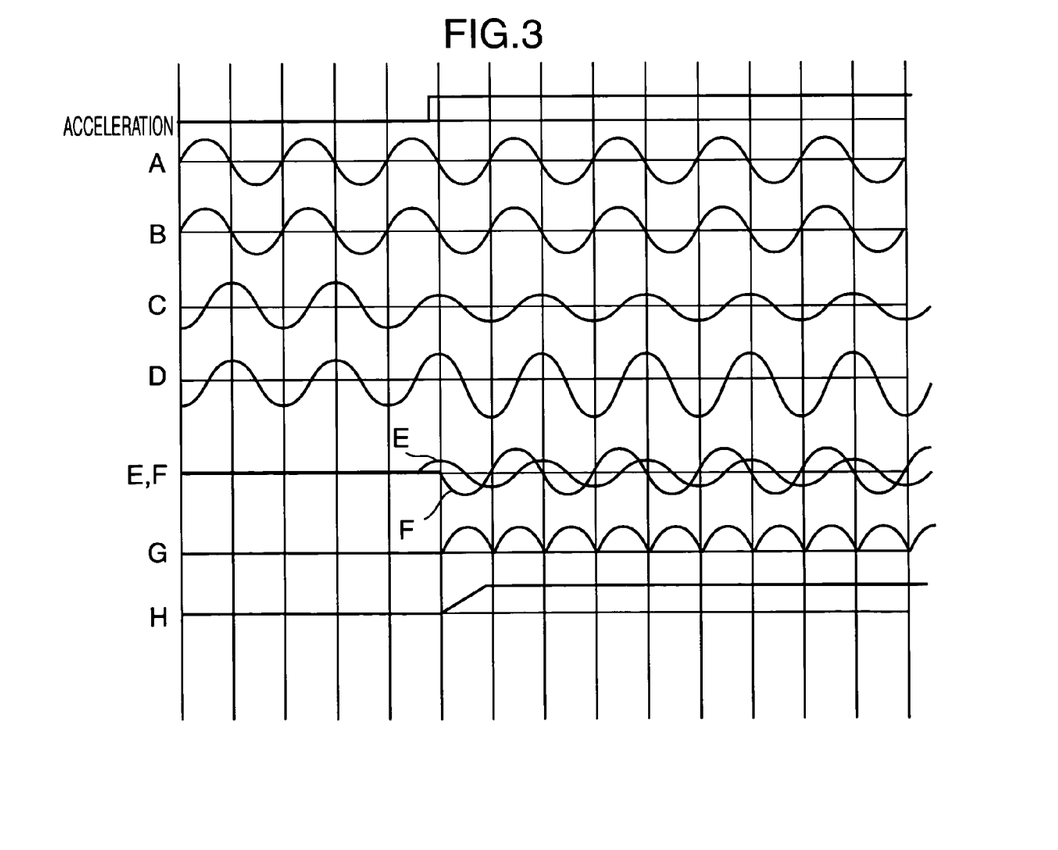
FIG. 3 is a wave form chart, showing an operation of each portion of the inertial sensor shown in FIG. 1.
Figure 4:
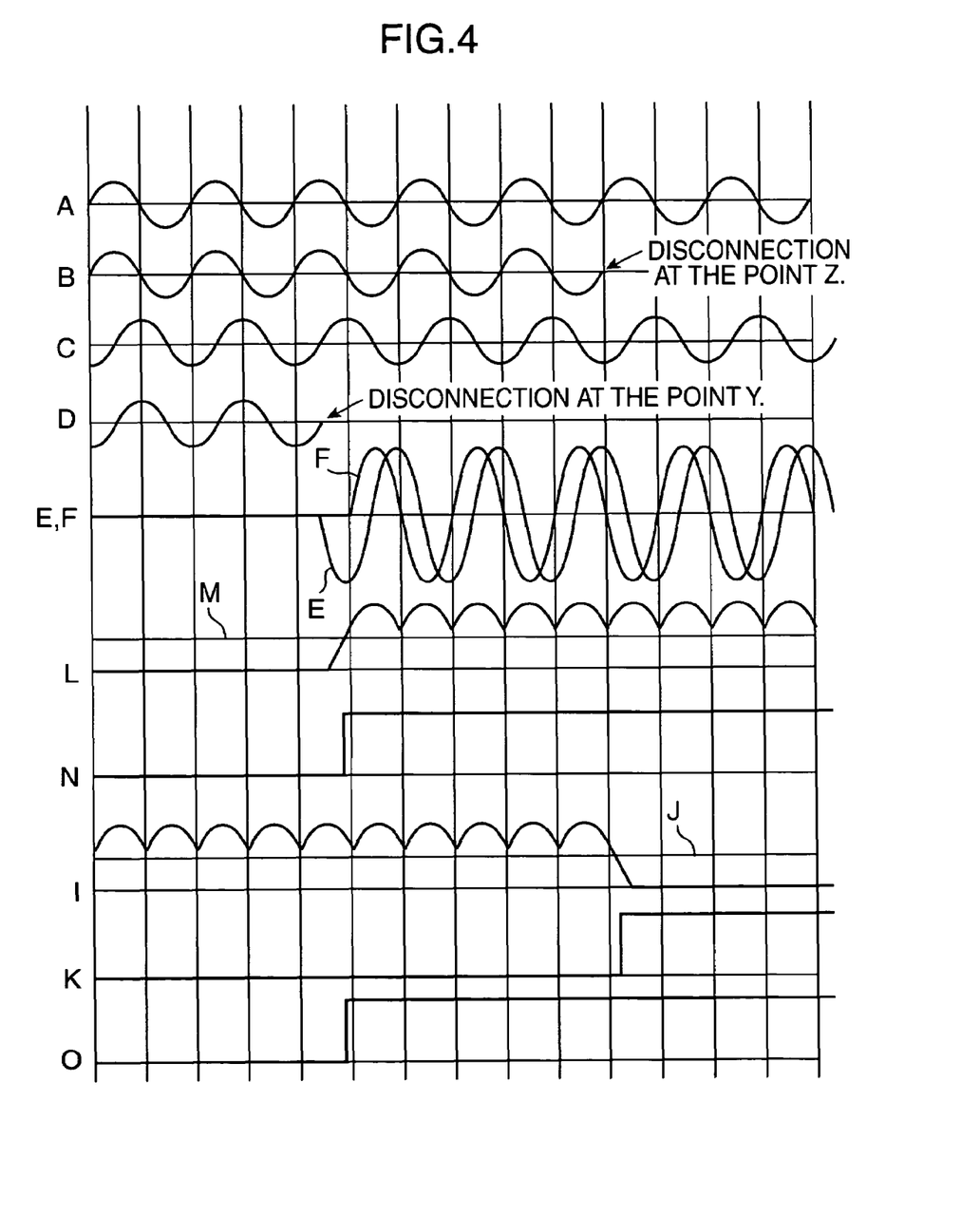
FIG. 4 is a wave form chart, showing an operation of each portion of the inertial sensor shown in FIG. 1, in the case where it is disconnected at a point Y and a point Z.
Figure 5:
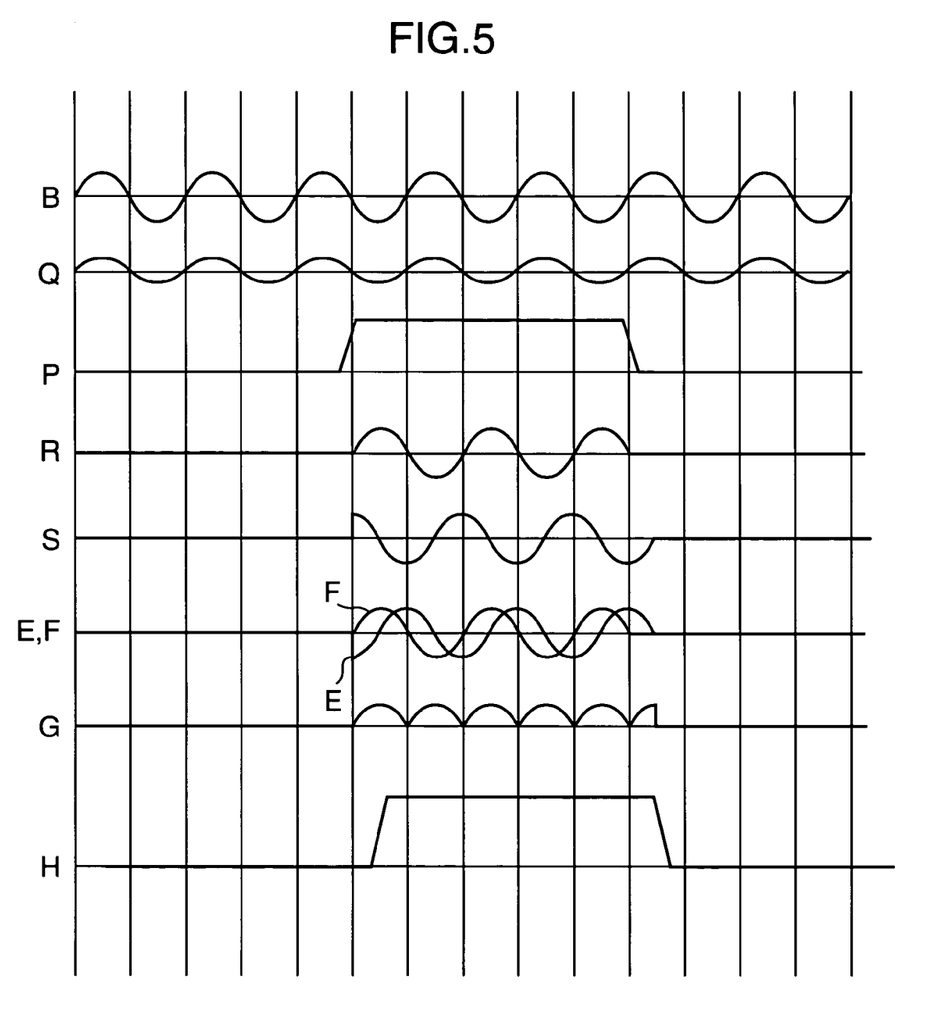
FIG. 5 is a wave form chart, showing an operation of each portion of the inertial sensor shown in FIG. 1, when a diagnostic request signal is given from the outside to the inertial sensor.

FIG. 1 is a block diagram, showing an inertial sensor according to a first embodiment of the present invention. FIG. 2 is an equivalent circuit diagram, showing a detecting element which configures the inertial sensor. FIG. 3 is a wave form chart, showing an operation of each portion of the inertial sensor. FIG. 4 is a wave form chart, showing an operation of each portion of the inertial sensor, in the case where it is disconnected at a point Y and a point Z. FIG. 5 is a wave form chart, showing an operation of each portion of the inertial sensor, when a diagnostic request signal is given from the outside to the inertial sensor.

The inertial sensor shown in FIG. 1 includes: a detecting element 6; a drive circuit 12; a detection circuit 27; and a self-diagnosis circuit 41. The detecting element 6 is provided with: a fixed portion 1; first and second detection electrodes 2a, 2b; first and second output terminals 3a, 3b; a movable portion 4; first and second movable electrodes 4a, 4b; and an input terminal 5.

The fixed portion 1 is made of silicone. On the fixed portion 1, the first and second detection electrodes 2a, 2b face each other at a predetermined distance. The movable portion 4 is made of silicone, and extends from the fixed portion 1, almost midway between the first and second detection electrodes 2a, 2b which face each other. The first and second movable electrodes 4a, 4b are placed on both surfaces of the movable portion 4, so that they face the first and second detection electrodes 2a, 2b, respectively. The input terminal 5 is placed on the side of the fixed portion 1 in the movable portion 4, so that it can send a signal to the first and second movable electrodes 4a, 4b. The first and second output terminals 3a, 3b are placed on the side of the fixed portion 1 in the first and second detection electrodes 2a, 2b, so that an electric charge can be taken out from the first and second detection electrodes 2a, 2b.

Herein, preferably, the fixed portion 1 and the movable portion 4 should be made of crystal, ceramics or the like, as well as silicone. In this case, an inertial sensor can be obtained with a detecting element which has a stable shape.

As shown in FIG. 2, a first capacitor portion which has an electrostatic capacity of C1 is formed by: the first detection electrode 2a which is connected to the first output terminal 3a; and the first movable electrode 4a which faces it. On the other hand, a second capacitor portion which has an electrostatic capacity of C2 is formed by: the second detection electrode 2b which is connected to the second output terminal 3b; and the second movable electrode 4b which faces it. The first movable electrode 4a and the second movable electrode 4b are connected to each other, and in addition, they are connected to the input terminal 5. In an ordinary design, the electrostatic capacity C1 and the electrostatic capacity C2 are initially adjusted so as to be almost equal to each other.

Again, with reference to FIG. 1, a predetermined voltage is supplied to a power-source terminal 10, and a ground terminal 11 is earthed. The power-source terminal 10 and the ground terminal 11 are connected to each circuit, so that electric power can be supplied. The drive circuit 12 includes a phase-transition device 13 which can shift the phase of an AC-bias signal voltage by an angle of 90 degrees. It supplies an AC-bias signal voltage to the input terminal 5.

The detection circuit 27 includes: a differential-type detector 22; a gain amplifier 23; a synchronous demodulator 24; an output amplifier 25; and a sensor output terminal 26.

The differential-type detector 22 is configured by current amplifiers 20a, 20b, and a differential detector 21. In each current amplifier 20a, 20b, there is inputted an electric charge which is generated in each first and second detection electrode 2a, 2b. An output of each current amplifier 20a, 20b is inputted in the differential detector 21.

In the gain amplifier 23, there is inputted an output of the differential detector 21. The synchronous demodulator 24 detects synchronously the wave of an output of the gain amplifier 23, using an AC-bias signal voltage which has passed through the phase-transition device 13. In the output amplifier 25, there is inputted an output of the synchronous demodulator 24. The sensor output terminal 26 is used to output, to the outside, a signal which has been smoothed and whose output has been adjusted by the output amplifier 25.

The self-diagnosis circuit 41 includes: an attenuator 30; a capacitor 31; a circuit breaker 32; a diagnostic terminal 33; and an OR circuit block 40. In the attenuator 30, an AC-bias signal voltage which has passed through the phase-transition device 13 is inputted, so that the attenuator 30 functions as the regulator. An output of the attenuator 30 is inputted in the capacitor 31. Then, the capacitor 31 supplies the output to an inversion input terminal of the current amplifier 20b, so that it functions as the injector. The circuit breaker 32 is placed between the attenuator 30 and the capacitor 31. Based on an operation from the outside, it connects or disconnects, to or from the capacitor 31, the signal line through which an AC-bias signal voltage that is outputted from the drive circuit 12 is supplied, that is, the output line of the attenuator 30. Thereby, it functions as the switch. The diagnostic terminal 33 accepts a diagnostic request signal from the outside, that is, a signal for switching the circuit breaker 32 from its opened state to closed state, so that an output of the attenuator 30 can be supplied to the capacitor 31. It is used to send out this diagnostic request signal to the circuit breaker 32.

The OR circuit block 40 includes: rectifiers 34, 36; comparators 35, 37; an OR circuit 38; and a fail output terminal 39. In the rectifier 34, there is inputted an AC-bias signal voltage which has passed through the phase-transition device 13. The rectifier 34 rectifies this signal, and thereafter, smoothes it. An output of the rectifier 34 is inputted in the comparator 35. Then, the comparator 35 compares and determines its output level. In the rectifier 36, there is inputted an output of the gain amplifier 23. Then, the rectifier 36 rectifies this signal, and thereafter, smoothes it. In the comparator 37, an output of the rectifier 36 is inputted, and then, it compares and determines the output level. An output of each comparator 35, 37 is inputted in the OR circuit 38, and then, the OR circuit 38 outputs its logical OR. An output of the OR circuit 38 is inputted in the fail output terminal 39.

As described above, the self-diagnosis circuit 41 is configured by using: the attenuator 30 which regulates an AC-bias signal voltage that is outputted from the drive circuit 12; and the capacitor 31 which supplies a signal from the attenuator 30 to a circuit that precedes the synchronous demodulator 24. Therefore, an inertial sensor can be obtained which is capable of arbitrarily adjusting a DC offset signal for actively diagnosing whether or not there is an abnormality in the sensor itself.

Furthermore, the self-diagnosis circuit 41 is provided with the circuit breaker 32 which switches the self-diagnosis circuit 41 from the state where it is in operation to the state where it is not in operation. The circuit breaker 32 is placed between the attenuator 30 and the capacitor 31. Therefore, an abnormality can be actively diagnosed, all the time or at any time, at an outside request for a diagnosis.

Moreover, as the switch, the circuit breaker 32 is used which, based on an operation from the outside, supplies or stops supplying, to the capacitor 31, an AC-bias signal voltage that is outputted from the drive circuit 12. Therefore, using a simple structure, the self-diagnosis circuit 41 can be switched between the state where it is in operation and the state where it is not in operation.

In addition, the attenuator 30 is used as the regulator. Therefore, the quantity of a DC offset signal for making an active diagnosis can be precisely initialized. Herein, as the regulator, a phase-transition device may also be used. Even in that case, the same advantage can be obtained.

Furthermore, the capacitor 31 is used as the injector. Therefore, using a simple structure, the quantity of a DC offset signal for making an active diagnosis can be precisely initialized. Herein, as the injector, a resistor may also be used. Even in that case, the same advantage can be obtained.

Moreover, the self-diagnosis circuit 41 monitors constantly an abnormality in the drive circuit 12 and the detecting element 6, and outputs a diagnostic signal to the outside. To do this, it is configured by: the rectifier 34 and the comparator 35 as the drive-system determining device which monitors the level of an AC-bias signal voltage; the rectifier 36 and the comparator 37 as the detection-system determining device which monitors the level of an output signal of the differential-type detector 22; and the OR circuit 38 which outputs, to the outside, an output of each of these drive-system determining device and detection-system determining device. Therefore, the level of an AC-bias signal voltage and the level of an output signal of the differential-type detector 22 are always monitored. Hence, if there is an abnormality in the drive system (also including wires which are drawn around) or in the detection system (also including wires which are drawn around between the detecting element 6 and the detection circuit 27), then an abnormality diagnostic signal can be instantaneously outputted to the outside of the sensor.

Herein, the configuration of the circuit breaker 32 is not limited especially to the above described example. For example, a circuit breaker which includes a timer circuit that times a predetermined period of time may also be used. In that case, based on an operation from the outside, an AC-bias signal voltage that is outputted from the drive circuit 12 is applied or cut off, to or from the capacitor 31, for a predetermined period of time. This allows an active abnormality diagnosis to be made for a predetermined period of time at an outside request for a diagnosis.

Next, a basic operation of this inertial sensor will be described below with reference to FIG. 1 to FIG. 3. Passing through the phase-transition device 13 from the drive circuit 12, an AC-bias signal voltage V (i.e., a wave form which is shown in a point A) is applied via the input terminal 5 to the first movable electrode 4a and the second movable electrode 4b.

Next, if an acceleration is applied in the direction of a detection axis shown in FIG. 1, the movable portion 4 is bent. When the movable portion 4 bends, for example, if the first movable electrode 4a comes close to the first detection electrode 2a, then the electrostatic capacity C1 increases, and thus, an electric charge $Q1=C1 \cdot V$ increases. At this time, the second movable electrode 4b goes apart from the second detection electrode 2b. Thereby, the electrostatic capacity C2 decreases, and thus, an electric charge $Q2=C2 \cdot V$ decreases. If the movable portion 4 bends in the direction opposite to that in the above described case, an increase and a decrease in the electric charges Q1, Q2 become opposite.

Herein, the first output terminal 3a connected to the first detection electrode 2a is connected to an inversion input terminal of the current amplifier 20b. On the other hand, the second output terminal 3b connected to the second detection electrode 2b is connected to an inversion input terminal of the current amplifier 20a. A non-inversion input terminal of each current amplifier 20a, 20b is kept at a certain voltage (e.g., it is set at a virtual ground of 2.5V).

Therefore, the wave forms of displacement currents at a point C and a point D shown in FIG. 1 are, as shown in FIG. 3, $i2=dQ2/dt$, $i1=dQ1/dt$, respectively. Then, an output of each current amplifier 20a, 20b is inputted in the differential detector 21. Its output (at a point E shown in FIG. 1) is shown by a wave form in FIG. 3.

Next, using the gain amplifier 23, the phase of an output of the differential detector 21 is advanced by 90 degrees. In addition, it is outputted (at a point F shown in FIG. 1) after being amplified (whose wave form is shown in FIG. 3). Next, an output of the gain amplifier 23 is inputted in the synchronous demodulator 24. At the same time, a signal at the point A shown in FIG. 1 is inputted in the synchronous demodulator 24, via the input terminal 5 (and a point B shown in FIG. 1). Thereby, the wave of an output of the gain amplifier 23 is synchronously detected, using a signal shown at the point B (i.e., the AC-bias signal voltage V). The wave form (at a point G shown in FIG. 1) of an output of the synchronous demodulator 24 after being synchronously detected is shown in FIG. 3.

Finally, the output of the synchronous demodulator 24 is smoothed and adjusted by the output amplifier 25. Thereafter (at a point H shown in FIG. 1), a signal (whose wave form is shown in FIG. 3) which corresponds to the magnitude of the applied acceleration is supplied to the sensor output terminal 26.

In such an operation as shown above, an external noise which is piled on an output of the detecting element 6, and an in-phase noise component by electrostatic coupling from another circuit or the like, can be largely reduced using the differential-type detector 22. In addition, as seen from a wave form at the point F shown in FIG. 3, a signal which passes through the synchronous demodulator 24 has only an in-phase (or negative-phase) component with respect to the AC-bias signal voltage V (whose wave form is shown at the point A). In other words, components which do not synchronize with the AC-bias signal voltage V, such as a mixed-in noise and a circuit DC offset, are all removed. Therefore, the inertial sensor which has a high S/N ratio can be configured by combining the differential-type detector 22 and the synchronous demodulator 24. This is extremely effective in the case where a smaller detecting element is used. Specifically, its performance is maintained, and simultaneously, the size is kept small and the cost is prevented from rising. Usually, it is difficult to realize those conflicting matters at the same time.

Next, a basic operation of a continuous diagnostic function in the case where it is disconnected at each of a point Y and a point Z shown in FIG. 1 will be described below with reference to FIG. 1 and FIG. 4. First, a basic operation will be described in the case where it is disconnected at the point Y shown in FIG. 1. At a normal time, an output signal (i.e., a wave form at the point D) from the first output terminal 3a is almost the same as an output signal (i.e., a wave form at the point C) from the second output terminal 3b. Hence, they are cancelled by each other, and thereby, an output signal (i.e., a wave form at the point E) of the differential detector 21 becomes zero.

However, if a disconnection is made at the point Y, an output signal from the first output terminal 3a and an output signal from the second output terminal 3b are not cancelled out by the differential detector 21. Thus, a signal (i.e., a wave form at the point E) which has a large amplitude comes out from the differential detector 21. This signal passes through the gain amplifier 23, and thus, it becomes a large-amplitude signal (i.e., a wave form at the point F) whose phase is advanced by 90 degrees. This signal is inputted in the rectifier 36. Then, using the comparator 37, an output (i.e., a wave format a point L) from the rectifier 36 is compared with a reference voltage M (shown as an example of its level in FIG. 4), and its decision is made. Thereafter, a signal (i.e., a wave form at a point N) is outputted from the comparator 37. This signal (i.e., a wave form at a point O) is outputted, through the OR circuit 38, in the fail output terminal 39. Thereby, in a moment, a signal which shows there is an abnormality in a detection circuit system can be outputted to the outside of the sensor.

Besides, at the time of initial designing, an output signal (i.e., a wave form at the point E) of the differential detector 21 may also be designed to become a certain signal other than zero; and simultaneously, the set level of the comparator 37, a certain different value. In that case, an abnormality in the detecting element 6 can also be instantaneously detected, for example, even if it is an abnormality which may be caused by a line-to-ground fault or the like, where an output signal (i.e., a wave form at the point E) of the differential detector 21 becomes zero.

Next, a basic operation will be described in the case where a disconnection is made at the point Z shown in FIG. 1. If a disconnection takes place at the point Z, the AC-bias signal voltage V (i.e., the wave form at the point A) does not reach the rectifier 34. Thereby, an output signal (i.e., a wave form at a point I) of the rectifier 34 becomes zero. Therefore, using the comparator 35, an output signal (i.e., a wave form at the point I) of this rectifier 34 is compared with a reference voltage J (shown as an example of its level in FIG. 4), and its decision is made. Thereafter, a signal (i.e., a wave format a point K) is outputted from the comparator 35. This signal (i.e., a wave format the point O) is outputted, through the OR circuit 38, in the fail output terminal 39. Thereby, in a moment, a signal which shows there is an abnormality in a detection circuit system can be outputted to the outside of the sensor.

Next, a basic operation of the same sensor shown in FIG. 1 at the time when a diagnostic request signal is received from the outside will be described below with reference to FIG. 1 and FIG. 5. While a diagnostic request signal (e.g., a high-level signal shown at a point P in FIG. 5) is being supplied to the diagnostic terminal 33, the circuit breaker 32 is closed. Then, the AC-bias signal voltage V (i.e., a wave form at each of the point A and the point B) is attenuated by the attenuator 30 to become a signal (i.e., a wave form at a point Q).

Next, the signal shown at the point Q passes through the circuit breaker 32 to become a signal which has a wave form shown at a point R, and then, it is supplied to the capacitor 31. The signal shown at the point R passes through the capacitor 31 to become a signal (which is a false electric signal that does not correspond to an acceleration which has actually been applied) which has a wave form shown at a point S. Then, it is supplied to an inversion input terminal of the current amplifier 20b. Thereby, a signal at the point E shown in FIG. 5 is obtained from the differential detector 21. Then, using the gain amplifier 23, the phase of an output of the differential detector 21 is advanced by 90 degrees. In addition, it is amplified, and thereafter, it is outputted (at the point F in FIG. 1) (i.e., a wave form in FIG. 5).

Next, the wave of an output of the gain amplifier 23 is synchronously detected by the synchronous demodulator 24. The wave form (at the point G in FIG. 1) of an output of the synchronous demodulator 24 after being synchronously detected is shown in FIG. 5. Finally, the output of the synchronous demodulator 24 is smoothed and adjusted by the output amplifier 25. Thereafter, a DC output is obtained as shown at the point H in FIG. 5.

Thereby, for example, when a diagnostic request signal P is received, if the sensor is normal and if the DC output shown at the point H is set to 500 mV, then an abnormality can be precisely detected, even though it is an abnormality which may largely affect the output sensitivity of the sensor, such as a short circuit and a change in elapsed time of parts (e.g., a feedback resistor (not shown) for an amplification) which configures the detection circuit 27. According to the above described configuration, there is no need to provide a dedicated electrode in the detecting element 6, or to pay such special attention. This makes the detecting element 6 smaller and simpler.

As described above, according to this embodiment, an inertial sensor can be obtained which has a simple structure. In addition, the self-diagnosis circuit 41 is provided which is formed by combining a continuous diagnostic function and a diagnostic function that responds to a diagnostic request signal from the outside. This makes it possible to detect almost completely every abnormal mode in the sensor, thus making the sensor more reliable.

Second Embodiment

Figure 6:
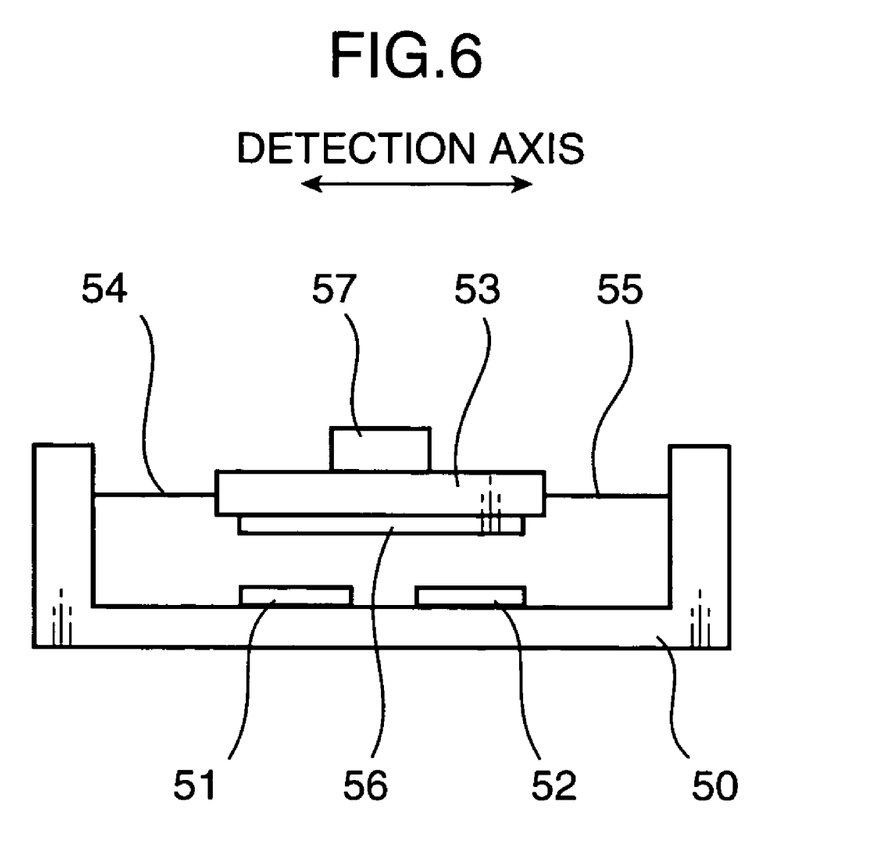
FIG. 6 is a side view of a detecting element of an inertial sensor according to a second embodiment of the present invention, showing its configuration.

FIG. 6 is a side view of a detecting element of an inertial sensor according to a second embodiment of the present invention, showing its configuration. According to this embodiment, a drive circuit, a detection circuit, or a self-diagnosis circuit is configured in the same way as according to the above described embodiment. Hence, their figure and description are omitted, and thus, only different parts are described in detail.

In the detecting element shown in FIG. 6, a first and second detection electrodes 51, 52 are provided in a fixed portion 50. A movable electrode 56 is provided in a movable portion 53, so that it faces the first and second detection electrodes 51, 52. The first and second detection electrodes 51, 52 are placed at a predetermined distance on one and the same plane of the fixed portion 50. The movable electrode 56 is placed, at a predetermined distance from each of the first and second detection electrodes 51, 52, and opposite to them. The AC-bias signal voltage V is applied to the movable electrode 56.

In the movable portion 53, an additional mass portion 57 is provided on the opposite side to the movable electrode 56, so that its center is located midway between the first and second detection electrodes 51, 52. Both ends of the movable portion 53 are connected to the fixed portion 50, via support portions 54, 55, respectively. The movable portion 53 is supported, so that the movable electrode 56 can rotate around the additional mass portion 57, in the directions of the electrode surfaces of the first and second detection electrodes 51, 52.

Next, a basic operation of this inertial sensor will be described below. An acceleration is applied in the direction (i.e., the directions of a detection axis shown in FIG. 6) parallel to the electrode surfaces of the first and second detection electrodes 51, 52. Thereby, the movable electrode 56 rotates around the additional mass portion 57 in the directions of the electrode surfaces of the first and second detection electrodes 51, 52. At this time, if one end of the electrode surface of the rotating movable electrode 56 comes close to the electrode surface of the first detection electrode 51, the other end of the electrode surface of the movable electrode 56 is displaced in the direction away from the electrode surface of the second detection electrode 52. On the other hand, if one end of the electrode surface of the movable electrode 56 goes away from the electrode surface of the first detection electrode 51, the other end of the electrode surface of the movable electrode 56 is displaced in the direction close to the electrode surface of the second detection electrode 52.

Hence, the applied acceleration causes the electrode surface of the movable electrode 56 to rotate. This allows the electric charges Q1, Q2 to increase and decrease (herein, the former is an electric charge which is generated in the electrode surface of the first detection electrode 51, and the latter is an electric charge which is generated in the electrode surface of the second detection electrode 52). Then, such an increase and a decrease are detected by the detection circuit 27 according to the first embodiment. This makes it possible to supply, to the sensor output terminal 26, a signal which corresponds to the magnitude of the applied acceleration.

According to the above described configuration, in this embodiment, the same advantages can be obtained as those according to the first embodiment. Besides, the movable electrode 56 is provided on one side of the movable portion 53, so that a capacitor portion for a detection can be provided only on one side of the movable portion 53. Herein, the capacitor portion is made up of the movable electrode 56 and the first and second detection electrodes 51, 52.

Third Embodiment

Figure 7:
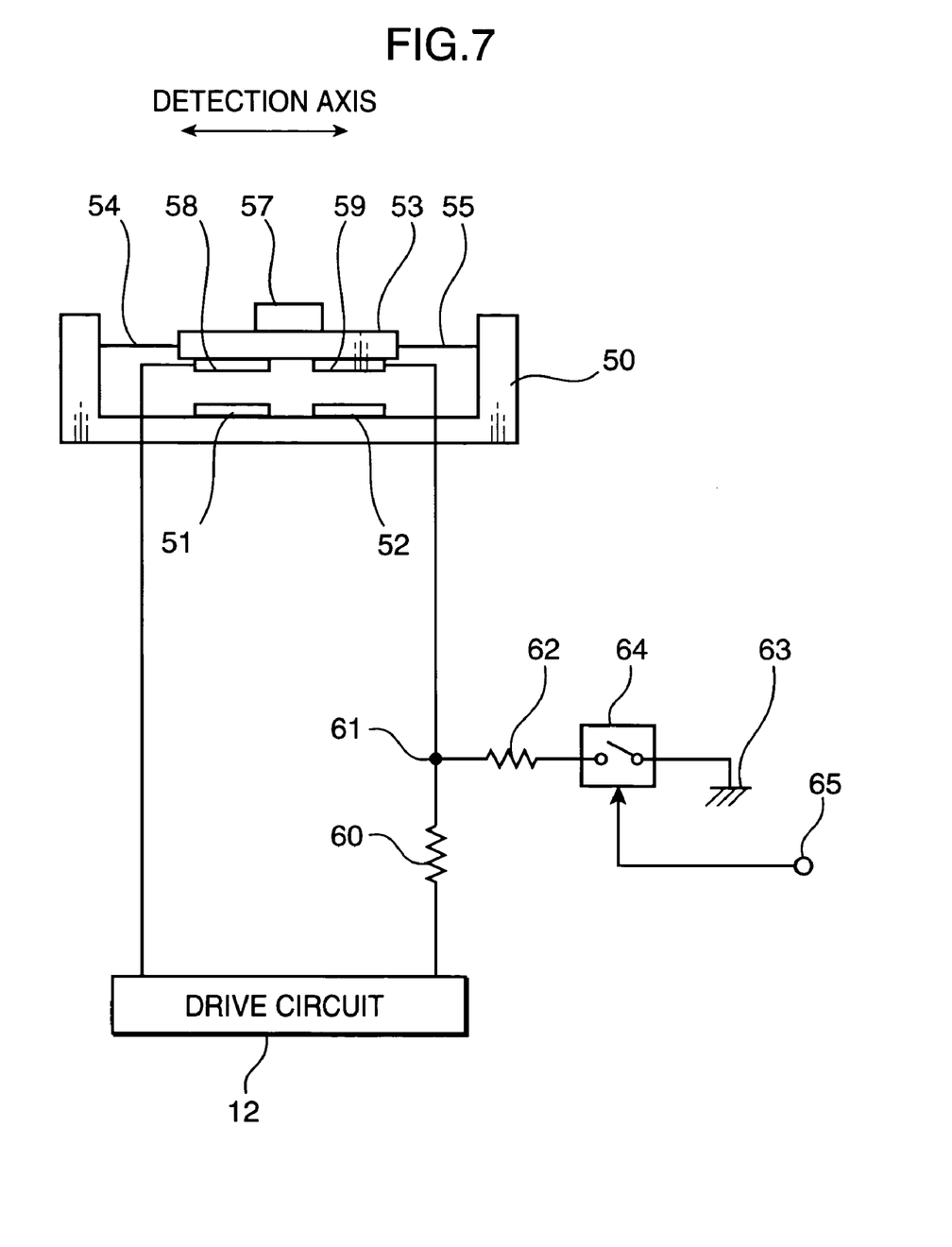
FIG. 7 is a block diagram, showing an inertial sensor according to a third embodiment of the present invention.

FIG. 7 is a block diagram, showing an inertial sensor according to a third embodiment of the present invention. In this embodiment, the parts which have the same configuration as those in the above described first and second embodiments are given their identical reference numerals. Hence, their detailed description is omitted, and thus, only different parts are described in detail.

As shown in FIG. 7, first and second movable electrodes 58, 59 are provided at a predetermined distance on one and the same plane of the movable portion 53 and oppositely to the first and second detection electrodes 51, 52, respectively. A first resistor 60 is inserted between the drive circuit 12 and the second movable electrode 59. It is used to set a predetermined AC-bias-signal-voltage value which is different from the AC-bias signal voltage V. A second resistor 62 is connected to a point 61 at which the second movable electrode 59 and the first resistor 60 are connected. A circuit breaker 64 is inserted between the second resistor 62 and a ground 63, and functions as the switch. A diagnostic terminal 65 accepts a diagnostic request signal from the outside. It is used to send out, to the circuit breaker 64, a signal for switching the circuit breaker 64 from the state where it is opened to the state where it is closed, using the diagnostic request signal.

Next, a basic operation of this inertial sensor will be described below. If there is no diagnostic request signal from the outside (i.e., if the circuit breaker 64 is kept opened), the AC-bias signal voltage V is applied to the first and second movable electrodes 58, 59 (i.e., the first and second movable electrodes 58, 59 have the same electric potential). In this time, an acceleration is detected in such an ordinary way as described in the second embodiment. Herein, even in this embodiment, the detection circuit 27 shown in FIG. 1 is used, though being omitted in the figure.

On the other hand, if there is a diagnostic request signal from the outside (i.e., if the circuit breaker 64 is kept closed), the value of an AC-bias signal voltage which is applied to the second movable electrode 59 becomes half the value of an AC-bias signal voltage which is applied to the first movable electrode 58. This is because a resistance value R1 of the first resistor 60 and a resistance value R2 of the second resistor 62 are set to be equal to each other. According to this configuration, if there is no abnormality in the sensor, a predetermined DC offset signal is supplied from a sensor output terminal. However, if an abnormality occurs in at least one of the detecting element, the drive circuit and the detection circuit, the predetermined DC offset signal is not supplied.

As described above, the resistance network is configured by the first resistor 60 which is inserted between the drive circuit 12 and the second movable electrode 59, and the second resistor 62 which is inserted between the connection point 61 of the second movable electrode 59 to the first resistor 60 and the circuit breaker 64. Therefore, despite such a simple configuration, an abnormality can be actively diagnosed. In addition, a predetermined DC offset signal is supplied from a sensor output terminal. This makes it possible to precisely preset the height of an AC-bias signal voltage V which is applied to each of the first and second movable electrodes 58, 59.

In this embodiment, the case is described in which the resistance value R1 of the first resistor 60 and the resistance value R2 of the second resistor 62 are equal to each other. However, their relative values are not necessarily limited to this. Besides, a description is given only about a configuration where the first resistor 60 and the second resistor 62 are used. However, the configuration is not necessarily limited to this. A resistance network, or another kind of configuration, can also be adopted.

Fourth Embodiment

Figure 8:
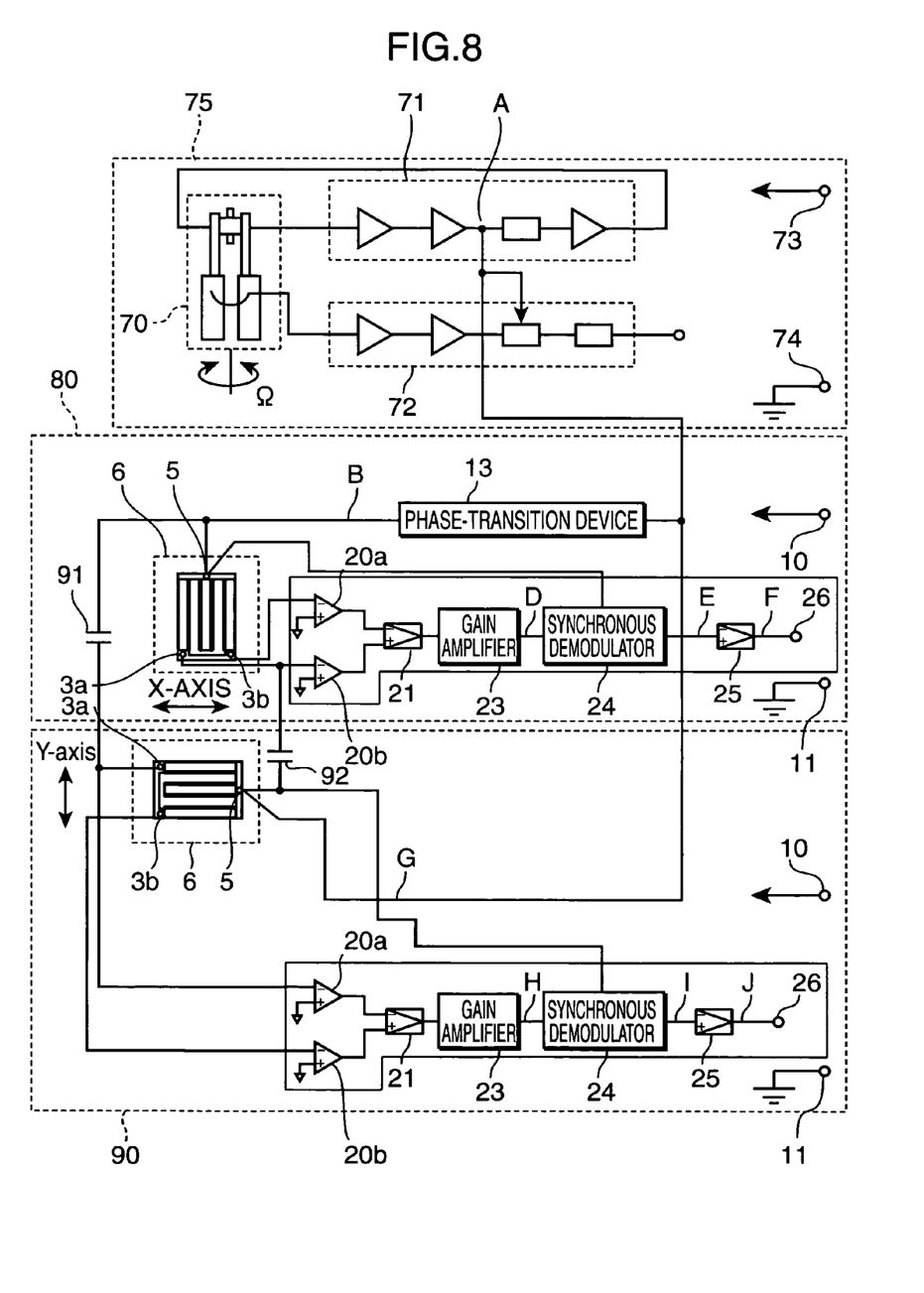
FIG. 8 is a block diagram, showing a combined sensor according to a fourth embodiment of the present invention.

FIG. 8 is a block diagram, showing a combined sensor according to a fourth embodiment of the present invention.

Figure 9:
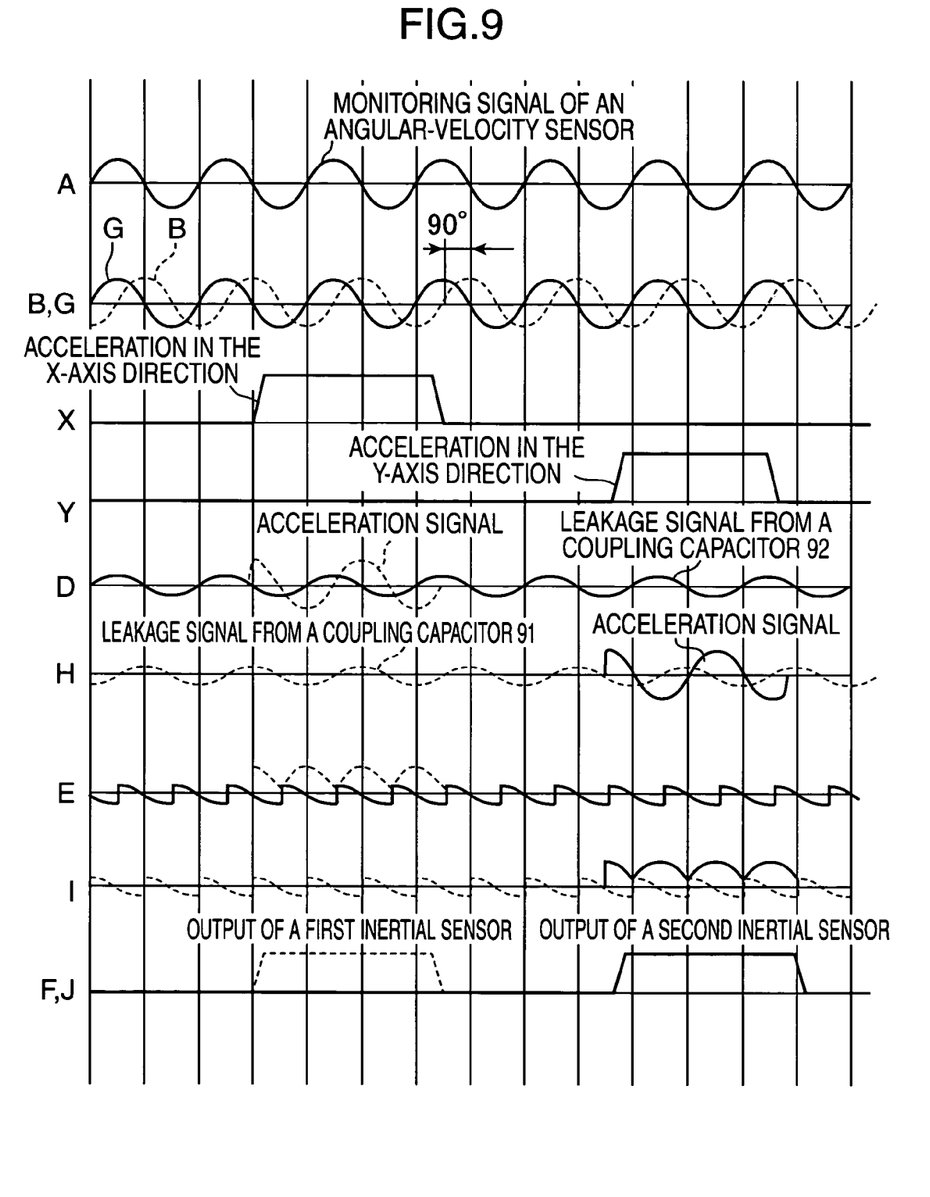
FIG. 9 is a wave form chart, showing an operation of each portion of the combined sensor shown in FIG. 8.

FIG. 9 is a wave form chart, showing an operation of each portion of the same sensor. In this embodiment, the parts which have the same configuration as those in the above described first embodiment are given their identical reference numerals and characters. Hence, their detailed description is omitted, and thus, only different parts are described in detail.

The combined sensor shown in FIG. 8 includes: a tuning fork-type angular-velocity sensor 75; and first and second inertial sensors 80, 90. The tuning fork-type angular-velocity sensor 75 is provided with: a vibrating element 70; a drive circuit 71; and a detection circuit 72. The drive circuit 71 drives the vibrating element 70. The detection circuit 72 processes the quantity of electricity which corresponds to an input angular velocity that is extracted from the vibrating element 70. A predetermined voltage is supplied to a power-source terminal 73, and a ground terminal 74 is earthed. The power-source terminal 73 and the ground terminal 74 are connected to each circuit, so that electric power can be supplied.

The two inertial sensors 80, 90 are located close to each other. Thus, a coupling capacitor 91 is formed between an AC-bias signal voltage which is inputted in the first inertial sensor 80 and a signal which is detected by the second inertial sensor 90. Between an AC-bias signal voltage which is inputted in the second inertial sensor 90 and a signal which is detected by the first inertial sensor 80, a coupling capacitor 92 is formed. Herein, the detection axes of the first inertial sensor 80 and the second inertial sensor 90 cross perpendicularly to each other (e.g., they are set as an X-axis and a Y-axis).

Next, a basic operation of this combined sensor will be described below with reference to FIG. 8 and FIG. 9. As shown in FIG. 8, the drive circuit 71 (i.e., the self-oscillation loop circuit which includes an AGC circuit) drives the vibrating element 70 at an excitation frequency of 50 kHz or less. Thereby, the amplitude of the vibrating element 70 can be kept constant. A monitoring signal comes out at a point A which monitors the amplitude of the vibrating element 70 which is being driven. This monitoring signal passes through the phase-transition device 13 which is provided in the first inertial sensor 80. Then, it is given to the input terminal 5, as an AC-bias signal voltage (at a point B in FIG. 8) whose phase lags by 90 degrees behind the monitoring signal at the point A. In addition, this monitoring signal is given, as an AC-bias signal voltage (at a point G in FIG. 8), directly to the input terminal 5 in the second inertial sensor 90.

Next, if an acceleration is applied in the X-axis direction of the first inertial sensor 80, an output (i.e., a wave form at a point D in FIG. 9) of the gain amplifier 23 in the first inertial sensor 80 also includes a leakage signal from the coupling capacitor 92, in addition to a signal which corresponds to the applied acceleration. Using an AC-bias signal voltage at the point B, the wave of the output of the gain amplifier 23 is detected by the synchronous demodulator 24. As a result, a wave form at a point E in FIG. 9 is obtained. Then, the output amplifier 25 smoothes and adjusts this output (i.e., the wave format the point E in FIG. 9) of the synchronous demodulator 24. Thereby, the leakage signal from the coupling capacitor 92 is cancelled, so that a wave form at a point F in FIG. 9 is obtained.

If an acceleration is applied in the Y-axis direction of the second inertial sensor 90, an output (i.e., a wave form at a point H in FIG. 9) of the gain amplifier 23 in the second inertial sensor 90 also includes a leakage signal from the coupling capacitor 91, in addition to a signal which corresponds to the applied acceleration. Using an AC-bias signal voltage at the point G (which is a common mode to the signal at the point A), the wave of the output of the gain amplifier 23 is detected by the synchronous demodulator 24. As a result, a wave form at a point I in FIG. 9 is obtained. Then, the output amplifier 25 smoothes and adjusts this output (i.e., the wave form at the point I in FIG. 9) of the synchronous demodulator 24. Thereby, the leakage signal from the coupling capacitor 91 is cancelled, so that a wave form at a point J in FIG. 9 is obtained.

As described above, in this embodiment, the phase of an AC-bias signal voltage which is applied to each of the first inertial sensor 80 and the second inertial sensor 90 is different by 90 degrees from each other. Therefore, the leakage signal from the coupling capacitor 92 and the leakage signal from the coupling capacitor 91 cannot come out from the output amplifier 25 of each of the first inertial sensor 80 and the second inertial sensor 90. In other words, as the drive circuit of the inertial sensor 80, the phase-transition device 13 is used, so that the phase of an AC-bias signal voltage of each of the two inertial sensors 80, 90 is different by 90 degrees from each other. As a result, a leakage signal of each of the two adjacent inertial sensors 80, 90 can be kept from interfering with each other. Besides, a 90-degree phase-transition device which allows a phase to lag by 90 degrees behind is provided in the first inertial sensor 80. This makes it possible to obtain the above described advantages, so long as a phase-transition device is provided in one inertial sensor.

Furthermore, in this embodiment, an excitation frequency of 50 kHz or less which is supplied from the drive circuit 71 (i.e., the self-oscillation loop circuit which includes an AGC circuit) of the first tuning fork-type angular-velocity sensor 75 is used for an AC-bias signal voltage of the first and second inertial sensors 80, 90. Therefore, there is no need for a dedicated circuit which is used only to generate an AC-bias signal voltage of the first and second inertial sensors 80, 90. In addition, a stable signal can be obtained as an AC-bias signal voltage of the first and second inertial sensors 80, 90.

Moreover, in this embodiment, the detection axes of the first and second inertial sensors 80, 90 are configured to become perpendicular to each other. Therefore, a leakage signal of each of the two inertial sensors 80, 90 can be kept from interfering with each other, and combined with this, an acceleration of each of the two axes which cross at right angles can be precisely detected.

In this way, in this embodiment, even if detecting elements of the inertial sensors 80, 90 are integrated and combined, they can be prevented from interfering with each other. In addition, a combined sensor can be provided whose sensitivity or temperature characteristic cannot be easily deteriorated.

Herein, in this embodiment, only in the first inertial sensor 80, an example is described where an AC-bias signal voltage is generated whose phase lags by 90 degrees behind the monitoring signal at the point A. However, the configuration is not necessarily limited to this, as long as the phase of an AC-bias signal voltage which is applied to each of the first inertial sensor 80 and the second inertial sensor 90 is different by 90 degrees from each other.

Furthermore, in this embodiment, an example is described where such a self-diagnosis circuit as shown in FIG. 1 is provided in the inertial sensors 80, 90. However, it is natural that the self-diagnosis circuit can be suitably provided.

Moreover, in this embodiment, an example is described where a tuning fork-type sensor is provided as the angular velocity sensor which configures the combined sensor, and such a sensor as shown in FIG. 1 is provided as the detecting element of the inertial sensor. However, the configuration is not necessarily limited to this. Hence, various sensors may also be combined, and the configuration can also be more freely designed.

This application is based on Japanese patent application serial No. 2003-345400, filed in Japan Patent Office on Oct. 3, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An inertial sensor, comprising:
    a detecting element which includes a first capacitor portion that is made up of a first detection electrode provided in a fixed portion and a first movable electrode provided in a movable portion, and a second capacitor portion that is made up of a second detection electrode provided in the fixed portion and a second movable electrode provided in the movable portion;
    a drive circuit operable to apply an AC-bias signal voltage to the first and second movable electrode electrodes;
    a detection circuit which includes:
        a differential-type detector operable to detect a difference in a quantity of an electric charge between the first and second detection electrodes, wherein the first and second movable electrodes are displaced according to an acceleration which is applied to the detecting element, and wherein a quantity of an electric charge which is generated in the second detection electrode decreases when a quantity of an electric charge which is generated in the first detection electrode increases, and conversely, the quantity of an electric charge which is generated in the second detection electrode increases when the quantity of an electric charge which is generated in the first detection electrode decreases;
        a synchronous demodulator operable to demodulate an output signal of the differential-type detector synchronously with the AC-bias signal voltage; and
        an output amplifier operable to regulate an output signal from the synchronous demodulator; and
    a self-diagnosis circuit operable to apply the AC-bias signal voltage ahead of the synchronous demodulator, and to output a diagnostic signal indicating whether there is an abnormality in at least one of the detecting element and the detection circuit.

2. The inertial sensor according to claim 1,
    wherein the first and second detection electrodes face each other at a predetermined distance, and the first and second movable electrodes are disposed midway between the first and second detection electrodes and opposite to the first and second detection electrodes, respectively; and
    wherein the fixed portion and the movable portion are configured so that an acceleration is applied in the directions perpendicular to the electrode surfaces of the first and second detection electrodes, and thereby, the electrode surfaces of the first and second movable electrodes are displaced in the directions perpendicular to the electrode surfaces of the first and second detection electrodes.

3. The inertial sensor according to claim 1, wherein the fixed portion and the movable portion are made of crystal, silicone, or ceramics.

4. The inertial sensor according to claim 1, wherein the self-diagnosis circuit includes a regulator operable to regulate the AC-bias signal voltage which is outputted from the drive circuit, and an injector operable to supply a signal from the regulator ahead of the synchronous demodulator.

5. The inertial sensor according to claim 4,
wherein the self-diagnosis circuit further includes a switch operable to switch between a state where the self-diagnosis circuit is in operation and a state where it is not in operation; and
wherein the switch is placed between the regulator and the injector.

6. The inertial sensor according to claim 5, wherein the switch includes a circuit breaker operable to connect or disconnect, to or from the injector, the AC-bias signal voltage which is outputted from the drive circuit according to an operation from outside.

7. The inertial sensor according to claim 5, wherein the switch is a circuit breaker which includes a timer circuit for connecting or disconnecting, to or from the injector, the AC-bias signal voltage which is outputted from the drive circuit, for a predetermined period of time, according to an operation from outside.

8. The inertial sensor according to claim 4, wherein the regulator is an attenuator, or a phase-transition device.

9. The inertial sensor according to claim 4, wherein the injector is a capacitor.

10. The inertial sensor according to claim 4, wherein the injector is a resistor.

11. The inertial sensor according to claim 1, wherein the self-diagnosis circuit includes:
a drive-system determining device operable to monitor a level of the AC-bias signal voltage, so that an abnormality is constantly monitored in the drive circuit and the detecting element, and the diagnostic signal is outputted to the outside;
a detection-system determining device operable to monitor a level of an output signal in the differential-type detector; and
an OR circuit operable to output, to the outside, an output of the drive-system determining device and the detection-system determining device.

* * * * *